United States Patent Office 3,280,668
Patented Oct. 25, 1966

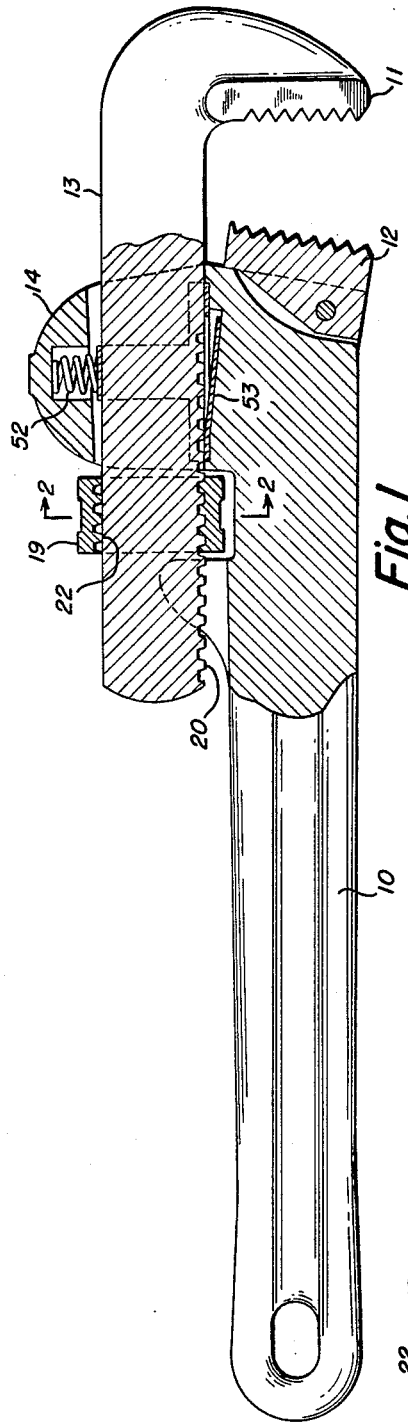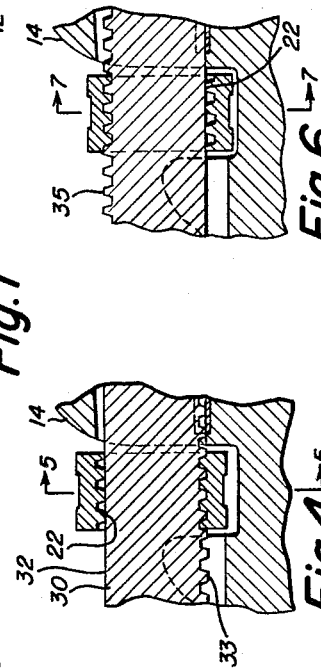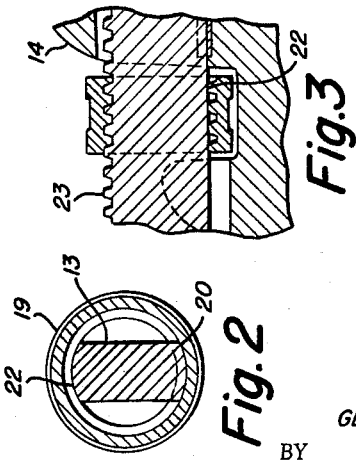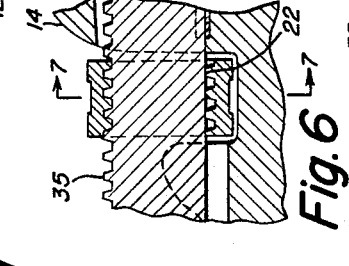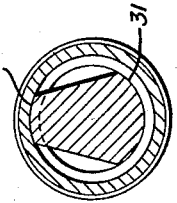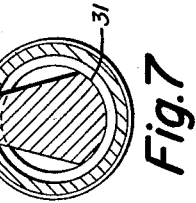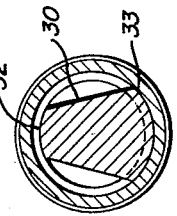
INVENTOR.
GEORGE V. WOODLING

3,280,668
THREAD CONSTRUCTION FOR HOOK JAW SHANKS AND ADJUSTING NUTS IN PIPE WRENCHES
George V. Woodling, 22077 W. Lake Road, Rocky River, Ohio
Filed Feb. 8, 1965, Ser. No. 430,938
6 Claims. (Cl. 81—101)

My invention relates to improvements in thread construction for hook jaw shanks and adjusting nuts in pipe wrenches.

An object of my invention is the provision of thread construction for a hook jaw shank and adjusting nut in pipe wrenches, wherein said shank has a greater effective depth and is thereby stronger to withstand excessive torque applied to the handle.

Another object of my invention is the provision of a shank having threads on only one of the top or bottom surfaces thereof with the other surface being relatively smooth, whereby the threads of the adjusting nut make threadable engagement with the threads on only one of the top or bottom surfaces of the shank as the case might be with the crest of the threads of the nut riding on the other smooth surface.

Another object is the provision of a tapered shank having a relatively narrow top smooth surface and a relatively wide bottom threaded surface, in combination with an adjusting nut having threads engaging the shank threads on the relatively wide bottom surface and having their crest riding on the relatively narrow top smooth surface, or vice versa.

Other objects and a fuller understanding of the invention may be had by referring to the following description and claims, taken in conjunction with the accompanying drawings, in which:

FIGURE 1 is a side view, partly in section, of a pipe wrench having a standard hook jaw shank substantially rectangular in cross-section and an adjusting nut embodying my thread construction, the view showing shank threads only on the bottom surface thereof;

FIGURE 2 is a cross-sectional view taken along the line 2—2 of FIGURE 1, showing the standard shank and the adjusting nut;

FIGURE 3 is a fragmentary view similar to FIGURE 1, showing shank threads only on the top surface thereof, being the reverse of FIGURE 1;

FIGURE 4 is a fragmentary view similar to FIGURE 1, showing my thread construction in a tapered shank having shank threads on only the bottom surface thereof;

FIGURE 5 is a cross-sectional view taken along the line 5—5 of FIGURE 4, showing the tapered shank and the adjusting nut;

FIGURE 6 is a fragmentary view similar to FIGURE 4, showing my thread construction in a tapered shank having threads on only the top surface thereof; and FIGURE 7 is a cross-sectional view taken along the line 7—7 of FIGURE 6, showing the tapered shank and the adjusting nut.

With reference to the drawing, a pipe wrench in which my invention may be incorporated may comprise a handle 10, having a hook jaw 11 and a heel jaw 12. The hook jaw 11 has a standard shank 13, substantially rectangular in cross-section, and is resiliently mounted for rocking action in a housing 14 which is an integral part of the handle. An adjusting nut 19 threadably engages the threads on the shank for securing the shank in the housing which has an internal wall defining an opening through which the shank extends. The opening defined by the internal wall of the housing is sufficiently large relative to the shank to permit pivotal or rocking movements of the shank in the housing under the influence of a top coil spring 52 and a bottom supporting spring structure 53. The opposed springs tend to resiliently center the shank in the opening of the housing.

In FIGURES 1 and 2, only the bottom surface of the shank 13 is provided with shank threads, indicated by the reference character 20. The top surface of the shank is relatively smooth and the crest 22 of the threads in the nut ride on the top surface. The threads in the nut make threadable engagement only with the shank threads on the bottom surface of the shank. With the threads of the nut engaging only the shank threads on the bottom of the shank, the pressure on the housing 14, as applied by the nut, is closely adjacent the handle. Here, the strength of the housing is the greatest where the strain is the greatest. This arrangement is particularly adaptable for the larger sizes of pipe wrenches. When the nut threadably engages both the top and bottom shank threads as practiced in the prior art, the pressure face of the nut may sometimes press against the back face of the housing at a high level, at a low level, or at any place therebetween, depending upon the tolerance of the matching parts. In my invention with the nut threadably engaging the bottom shank threads only, the pressure face of the nut is caused to press against the back face of the housing at a low level where the strength of the housing is. The matching of tolerance is eliminated.

FIGURE 3 is just the reverse of FIGURE 1, in that the shank threads 23 are provided on the top surface of the shank and the bottom surface is relatively smooth. Here, the threads in the adjusting nut make threadable engagement only with the shank threads on the top surface of the shank with their crest riding on the bottom surface. This reverse arrangement may be used in the smaller sizes of pipe wrenches. With the shank threads provided only on the bottom surface of the shank with the top surface smooth, or vice versa, the effective depth of the shank is increased by an amount substantially equal to the height of the threads which would normally be provided on the smooth surface. This increase in effective height of the shank makes the shank stronger than it would be if threads were provided on both the top and bottom surfaces, which is standard practice in the prior art.

The invention in FIGURES 4 and 5 is the same as that shown in FIGURES 1 and 2, except that the shank 30 is tapered instead of being substantially rectangular. The tapered shank 30 comprises an inverted substantially V-shaped cross-section with the bottom surface being wider than the top surface. The top and bottom surfaces define respectively bottom and top substantially cylindrical segments. In FIGURES 4 and 5, the shank threads are provided only on the wide bottom surface and are identified by the reference character 33. The top narrow surface, which is identified by the reference character 32, is relatively smooth. With a tapered shank having shank threads on the wide bottom surface thereof, as shown in FIGURES 4 and 5, the threads in the nut make a wider engagement with the shank threads than they do in FIGURES 1 and 2. This increased thread engagement is particularly applicable to the larger sizes of pipe wrenches, because the greatest strain on the housing, as applied by the nut, is closely adjacent the handle.

In FIGURES 6 and 7, the shank threads 35 are provided on the narrow top surface thereof with the wide bottom surface, which is identified by the reference character 31, being relatively smooth. This is just the reverse of FIGURES 4 and 5. This arrangement may be used in the smaller sizes of pipe wrenches. Regardless of whether the shank threads are provided on the bottom or top surface of the shank with the other surface being relatively smooth, the effective depth of the shank is increased by an amount substantially equal to the height of the threads which would normally be provided on the smooth surface. This increased depth enables the shank to withstand a greater torque applied to the handle.

In this application the words "top" and "bottom" as applied to the shank and housing, as well as related designations, are used in the general sense and cover all conditions in which the wrench might be used, whether horizontal, vertical or upside-down.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. In a nut-fulcrum type pipe wrench having a handle with a heel jaw at one end and a hook jaw housing adjacent the heel jaw, said housing having an internal wall defining an opening therethrough, a hook jaw having a shank mounted in said hook jaw housing and extending through said opening, an adjusting nut surrounding and threadably engaging said shank for securing said shank in said housing, said shank having top and bottom surfaces comprising respectively top and bottom substantially cylindrical segments, the improvement of a thread construction for said shank and said adjusting nut, said improvement comprising shank threads on at least one of said substantially cylindrical segments with the other of said substantially cylindrical segment being relatively smooth, said adjusting nut having internal threads continuously engaging said shank threads for all turnable positions of said adjusting nut for securing said shank in said housing with the crest of said nut threads riding on said smooth segment.

2. In a nut-fulcrum type pipe wrench having a handle with a heel jaw at one end and a hook jaw housing adjacent the heel jaw, said housing having an internal wall defining an opening therethrough, a hook jaw having a shank mounted in said hook jaw housing and extending through said opening, an adjusting nut surrounding and threadably engaging said shank for securing said shank in said housing, said shank having top and bottom surfaces comprising respectively top and bottom substantially cylindrical segments, the improvement of a thread construction for said shank and said adjusting nut, said improvement comprising shank threads on said bottom substantially cylindrical segment with said top substantially cylindrical segment being relatively smooth, said adjusting nut having internal threads continuously engaging said shank threads for all turnable positions of said adjusting nut for securing said shank in said housing with the crest of said nut threads riding on said smooth segment.

3. In a nut-fulcrum type pipe wrench having a handle with a heel jaw at one end and a hook jaw housing adjacent the heel jaw, said housing having an internal wall defining an opening therethrough, a hook jaw having a shank mounted in said hook jaw housing and extending through said opening, an adjusting nut surrounding and threadably engaging said shank for securing said shank in said housing, said shank having top and bottom surfaces comprising respectively top and bottom substantially cylindrical segments, the improvement of a thread construction for said shank and said adjusting nut, said improvement comprising shank threads on said top substantially cylindrical segment with said bottom substantially cylindrical segment being relatively smooth, said adjusting nut having internal threads continuously engaging said shank threads for all turnable positions of said adjusting nut for securing said shank in said housing with the crest of said nut threads riding on said smooth segment.

4. In a nut-fulcrum type pipe wrench having a handle with a heel jaw at one end and a hook jaw housing adjacent the heel jaw, said housing having an internal wall defining an opening therethrough, a hook jaw having a shank mounted in said hook jaw housing and extending through said opening, an adjusting nut surrounding and threadably engaging said shank for securing said shank in said housing, said shank having an inverted substantially V-shaped cross-section with a relatively narrow top surface and a relatively wide bottom surface, said top and bottom surfaces comprising respectively top and bottom substantially cylindrical segments, the improvement of a thread construction for said shank and said adjusting nut, said improvement comprising shank threads on at least one of said substantially cylindrical segments with the other of said substantially cylindrical segment being relatively smooth, said adjusting nut having internal threads continuously engaging said shank threads for all turnable positions of said adjusting nut for securing said shank in said housing with the crest of said nut threads riding on said smooth segment.

5. In a nut-fulcrum type pipe wrench having a handle with a heel jaw at one end and a hook jaw housing adjacent the heel jaw, said housing having an internal wall defining an opening therethrough, a hook jaw having a shank mounted in said hook jaw housing and extending through said opening, surrounding and threadably engaging said shank for securing said shank in said housing, said shank having an inverted substantially V-shaped cross-section with a relatively narrow top surface and a relatively wide bottom surface, said top and bottom surfaces comprising respectively top and bottom substantially cylindrical segments, the improvement of a thread construction for said shank and said adjusting nut, said improvement comprising shank threads on said bottom substantially cylindrical segment with said top substantially cylindrical segment being relatively smooth, said adjusting nut having internal threads continuously engaging said shank threads for all turnable positions of said adjusting nut for securing said shank in said housing with the crest of said nut threads riding on said smooth segment.

6. In a nut-fulcrum type pipe wrench having a handle with a heel jaw at one end and a hook jaw housing adjacent the heel jaw, said housing having an internal wall defining an opening therethrough, a hook jaw having a shank mounted in said hook jaw housing and extending through said opening, an adjusting nut surrounding and threadably engaging said shank for securing said shank in said housing, said shank having an inverted substantially V-shaped cross-section with a relatively narrow top surface and a relatively wide bottom surface, said top and bottom surfaces comprising respectively top and bottom substantially cylindrical segments, the improvement of a thread construction for said shank and said adjusting nut, said improvement comprising shank threads on said top substantially cylindrical segment with said bottom substantially cylindrical segment being relatively smooth, said adjusting nut having internal threads continuously engaging said shank threads for all turnable positions of said adjusting nut for securing said shank in said housing with the crest of said nut threads riding on said smooth segment.

References Cited by the Examiner

UNITED STATES PATENTS

| | | | |
|---|---|---|---|
| 13,221 | 7/1855 | Joslyn | 81—167 |
| 546,142 | 9/1895 | Friede | 81—167 |
| 1,126,335 | 1/1915 | Allan et al. | 81—101 |
| 1,564,035 | 12/1925 | Trabold | 81—105 |
| 1,727,623 | 9/1929 | Thewes | 81—101 |

FOREIGN PATENTS 554,499   3/1923   France.

WILLIAM FELDMAN, *Primary Examiner.*

MILTON S. MEHR, *Examiner.*